(12) United States Patent
Wada et al.

(10) Patent No.: US 7,911,188 B2
(45) Date of Patent: Mar. 22, 2011

(54) POWER GENERATION CONTROL APPARATUS OF A ROTATING ELECTRICAL MACHINE FOR A VEHICLE

(75) Inventors: Noriyuki Wada, Chiyoda-ku (JP);
 Masato Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 640 days.

(21) Appl. No.: 11/993,567

(22) PCT Filed: Mar. 28, 2006

(86) PCT No.: PCT/JP2006/306291
 § 371 (c)(1),
 (2), (4) Date: Dec. 21, 2007

(87) PCT Pub. No.: WO2006/137200
 PCT Pub. Date: Dec. 28, 2006

(65) Prior Publication Data
 US 2010/0072958 A1 Mar. 25, 2010

(30) Foreign Application Priority Data

Jun. 24, 2005 (JP) .................. 2005-184784

(51) Int. Cl.
 *H02P 9/00* (2006.01)
 *H02P 11/00* (2006.01)
(52) U.S. Cl. ............... 322/44; 322/17; 322/59
(58) Field of Classification Search ............ 322/17, 322/44, 89, 28, 24, 59, 22; 290/46; 307/10.1
 See application file for complete search history.

(56) References Cited

U.S. PATENT DOCUMENTS

| | | | | | |
|---|---|---|---|---|---|
| 5,726,559 | A | * | 3/1998 | Taniguchi et al. | 322/34 |
| 5,739,677 | A | * | 4/1998 | Tsutsui et al. | 322/25 |

(Continued)

FOREIGN PATENT DOCUMENTS

JP 6-5969 5/1983

(Continued)

OTHER PUBLICATIONS

Japanese Office Action corresponding to Japanese Patent Application No. 2005-184784, dated Jun. 10, 2010.

*Primary Examiner* — Julio Gonzalez
(74) *Attorney, Agent, or Firm* — Sughrue Mion, PLLC

(57) ABSTRACT

A power generation control apparatus of a rotating electrical machine for a vehicle is obtained which achieves load response control in a plurality of electric power generation control modes even if a generation voltage final target value rapidly changes. The apparatus includes a power control unit 103 and a storage battery 104 connected to a rotating electrical machine 102, and a rotation speed detection part 105 for detecting a rotational speed Na. The power control unit 103 controls power generation in a first mode when the rotational speed Na during operating as a generator is less than or equal to a predetermined value, and controls power generation in a second mode when the rotational speed Na is higher than the predetermined value. The power control unit 103 includes a generation voltage command value calculation section 111 that sets generation voltage command values Vr1, Vr2 for the individual modes, respectively, so as to follow a final target value to the storage battery 104, and a generation voltage update calculation command section 110 that instructs update timing tn, an amount of increase dH and an amount of decrease dL of each generation voltage command value to the generation voltage command value calculation section 111 based on the states of the rotating electrical machine and of the storage battery.

14 Claims, 6 Drawing Sheets

U.S. PATENT DOCUMENTS

| | | | |
|---|---|---|---|
| 6,469,476 B1 | 10/2002 | Barrett et al. | |
| 6,771,040 B2 * | 8/2004 | Kusumoto et al. | 318/801 |
| 2008/0225565 A1 * | 9/2008 | Tsujimoto et al. | 363/127 |
| 2010/0087974 A1 * | 4/2010 | Nakajima et al. | 701/22 |

FOREIGN PATENT DOCUMENTS

| | | | |
|---|---|---|---|
| JP | 5-103433 A | | 4/1993 |
| JP | 7-123796 A | | 5/1995 |
| JP | 8-37702 A | | 2/1996 |
| JP | 08037702 A | * | 2/1996 |
| JP | 9-19194 A | | 1/1997 |
| JP | 09019194 A | | 1/1997 |
| JP | 9-46920 A | | 2/1997 |
| JP | 2001-245441 A | | 9/2001 |
| JP | 2003-61399 A | | 2/2003 |
| JP | 2003061399 A | | 2/2003 |

* cited by examiner

POWER GENERATION CONTROL APPARATUS OF A ROTATING ELECTRICAL MACHINE FOR A VEHICLE

TECHNICAL FIELD

The present invention relates to a power generation control apparatus of a rotating electrical machine that has an armature winding and a field winding and is connected to an internal combustion engine installed on a vehicle so as to operate at least as a generator, and more specifically it relates to a power generation control apparatus of a rotating electrical machine for a vehicle that operates, for example, as an electric motor at the time of starting an internal combustion engine, and as a generator after the starting of the internal combustion engine.

BACKGROUND ART

In recent years, in internal combustion engines for vehicles, the development and practical use of hybrid vehicles having an internal combustion engine and a power source (e.g., a generator motor, etc.) other than the internal combustion engine are being in progress for the purposes of environmental protection and improvement in fuel economy.

In such a hybrid vehicle, either one of the internal combustion engine and the power source other than the internal combustion engine is selectively used in accordance with the traveling condition of the vehicle.

For example, in order to suppress unnecessary fuel consumption during idling, there has been proposed a technique called idle stop.

The idle stop is a technique that stops an internal combustion engine when a vehicle is stopped by a traffic signal at an intersection or the like, and thereafter restarts the internal combustion engine by means of a generator motor when the intention of a driver to start the vehicle (an operation of an accelerator, a brake or the like) is sensed.

As a generator motor installed on such a kind of hybrid vehicle, there is employed a three-phase, alternating current synchronous generator motor, and when the generator motor is used as an electric motor, electric power is supplied to the generator motor through a power converter that converts DC power from a storage battery (e.g., a battery) into AC power.

However, when an induced voltage generated by the generator motor becomes higher than a battery voltage during the generator motor operates as an electric motor, it becomes unable to supply electric power to the generator motor. Here, note that the induced voltage from the generator motor is proportional to the rotational speed of the generator motor, the number of turns of an armature winding and a main magnetic flux.

In addition, at this time, in order to start the internal combustion engine, the generator motor is required to have a characteristic that can raise its rotational speed to the vicinity of the idle rotational speed of the engine, so it is necessary to make the generator motor operate as an electric motor up to a rotational speed equal to or higher than the idle rotational speed.

Accordingly, some contrivance is required to prevent the induced voltage from reaching the battery voltage even if the rotational speed of the generator motor rises to equal to or higher than the idle rotational speed, so for example, in the design of the generator motor, a technique such as reducing the number of turns of the armature winding to a required minimum is adopted.

On the other hand, when the generator motor is used as a generator, the current to be supplied to a field winding is adjusted by making use of the induced voltage, similar to a vehicular generator, so that desired AC power is generated from the armature winding, and this generated power is rectified (DC converted) by a diode and is supplied to the battery.

Of course, the generator motor is required to operate as a generator after the starting of the internal combustion engine, so the generator motor need be designed to execute a power generation operation even at the idle rotational speed.

However, as stated above, in the design of the generator motor, in case where the number of turns of the armature winding is reduced from that for an ordinary vehicular generator so as to suppress the rise of the induced voltage, there is a possibility that the power generation characteristic required in a low-speed rotational region can not be satisfied.

Accordingly, there has been proposed a technique in which in a low-speed rotational region, power generating operation is carried out in a first mode by a compensation current for phase control of an armature winding and a current to be supplied to a field winding, and thereafter, when the rotational speed is increased to raise an induced voltage to a satisfactory extent, power generating operation is performed in a second mode by a field duty that controls the current to be supplied to the field winding (see, for example, a first patent document).

However, in load response control of the generator motor having a plurality of power generating operation modes, switching between a first mode in which the rotational speed is low and a second mode in which the rotational speed is high need be seamlessly effected or succeeded from one to another, but in the above-mentioned first patent document, no consideration is given to this matter.

In addition, control should be performed in consideration of a variety of electric load conditions of a vehicle and a rotational speed condition of an internal combustion engine (engine), but in the above-mentioned first patent document, no consideration is given to this matter, either.

[First Patent Document] Japanese patent No. 3517405

DISCLOSURE OF THE INVENTION

Problems to be Solved by the Invention

In the conventional power generation control apparatus for a vehicular rotating electrical machine, no consideration is given to load response control in the generator motor having a plurality of power generation operations, so there has been a problem that seamless succession can not be made upon changing from the first mode to the second mode.

In addition, control in consideration of a variety of electric load conditions of the vehicle and the rotational speed condition of the internal combustion engine is not made, so there has been a problem of reduced reliability.

Moreover, the ripple characteristics of generated voltages in the individual modes are also different from one another, so there has been a problem that average generated voltages in the individual modes, respectively, are different from one another even with the same generation voltage command in the individual modes.

The present invention is intended to obviate the problems as referred to above, and has for its object to obtain a power generation control apparatus of a rotating electrical machine for a vehicle which achieves load response control particularly in the rotating electrical machine having a plurality of power generating operation modes in accordance with the rotational speed of the rotating electrical machine without inviting an increase in the size and cost as well as a reduction in the reliability of the apparatus.

Means for Solving the Problems

A power generation control apparatus of a rotating electrical machine for a vehicle according to the present invention includes: a power control unit that is connected to the rotating electrical machine for controlling thereof, the rotating electrical machine having an armature winding and a field winding and being mechanically coupled with an internal combustion engine for the vehicle so as to operate at least as a generator; a storage battery that delivers and receives electric power to and from the rotating electrical machine through the power control unit; and a rotational speed detection part that detects a rotational speed of the internal combustion engine; wherein when the rotational speed of the generator motor is less than or equal to a first predetermined rotational speed during an operation of the generator motor as the generator, the power control unit controls a power generating operation of the rotating electrical machine in a first mode based on a compensation current for phase control to the armature winding and an energization current to the field winding, and when the rotational speed of the rotating electrical machine is higher than the first predetermined rotational speed, the power control unit controls the power generating operation of the rotating electrical machine in a second mode based on a field duty that controls the energization current to the field winding; and wherein the power control unit includes: a generation voltage command value calculation section that sets a current generation voltage command value for each of the first and second modes so as to follow a final target value of a generation voltage to the storage battery; and a generation voltage update calculation command section that instructs a next generation voltage command update timing, an amount of increase and an amount of decrease of the generation voltage command value to the generation voltage command value calculation section based on a state of the rotating electrical machine and a state of the storage battery.

Effects of the Invention

According to the present invention, not only in a steady state but also in case where a final target value of a generated voltage is changed rapidly, load response control can be achieved in a plurality of generation voltage control modes in accordance with the state of a rotating electrical machine (a generator motor) or a storage battery (a battery).

BEST MODE FOR CARRYING OUT THE INVENTION

Hereinafter, a first preferred embodiment of the present invention will be described in detail while referring to the accompanying drawings.

Embodiment 1

Figure 1:
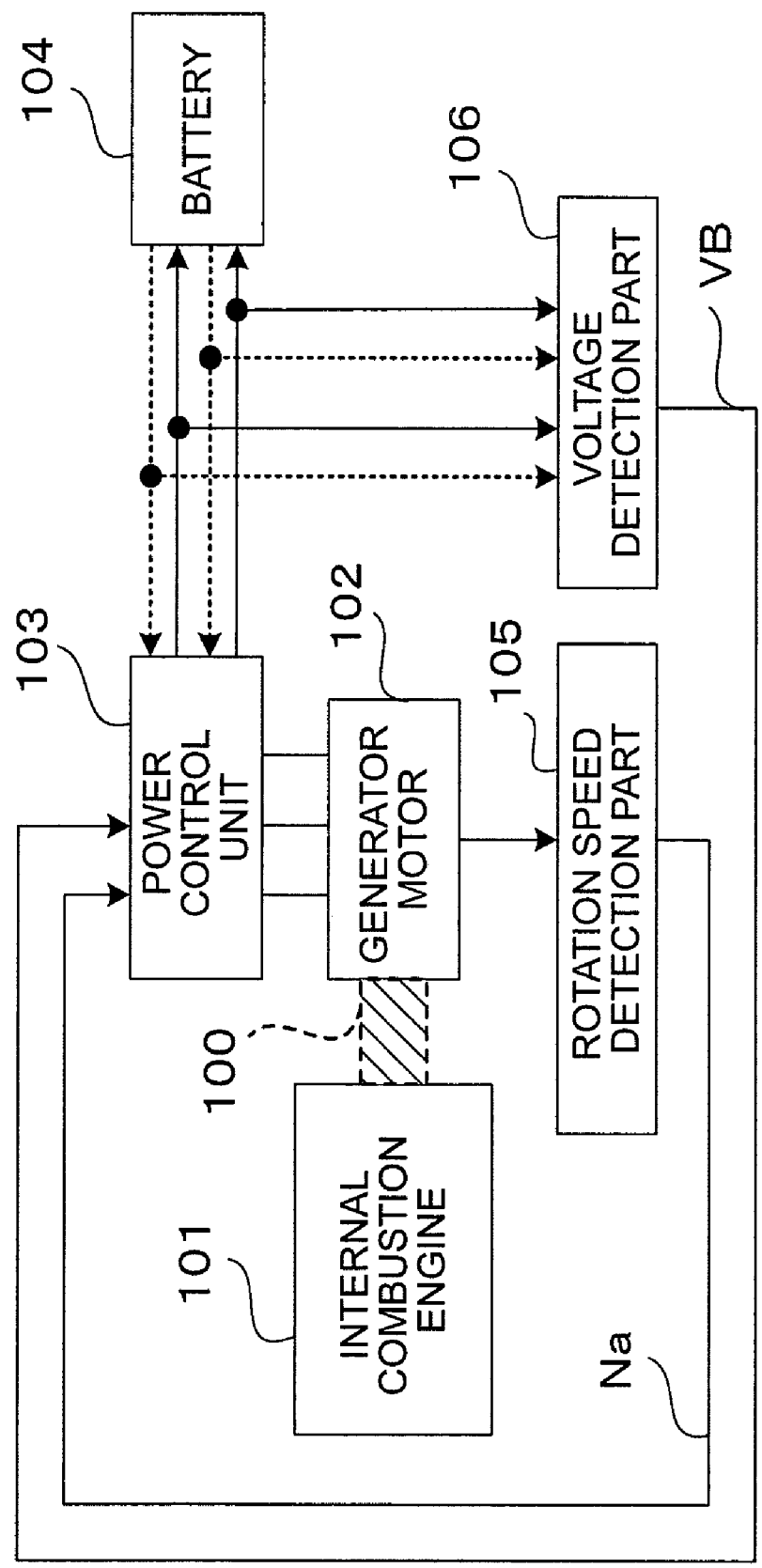
FIG. 1 is a block diagram partially schematically showing a power generation control apparatus of a rotating electrical machine for a vehicle according to a first embodiment of the present invention (embodiment 1).

FIG. 1 is a block diagram that partially schematically shows a power generation control apparatus of a rotating electrical machine for a vehicle according to a first embodiment of the present invention.

Note that a generator (an alternator) can be used as a rotating electrical machine for a vehicle, but description will be made herein by taking, as an example, a case where a generator motor 102 for a hybrid vehicle is typically used.

In FIG. 1, the generator motor 102 is arranged in an internal combustion engine 101 (e.g., a gasoline engine, a diesel engine, etc.) installed on a vehicle (not shown) in a state to be able to deliver and receive torque through a coupling unit 100 (a belt, a pulley, etc.) or by direct coupling.

The generator motor 102 mechanically coupled with the internal combustion engine 101 is constituted by a rotating electrical machine that has an armature winding and a field winding (to be described later), and operates as a generator in an ordinary operation. The generator motor also operates for example as an electric motor (drive source) during engine starting, and has an assisting function for a driving force of the internal combustion engine 101.

A power control unit 103 for controlling the generator motor 102 is electrically connected to the generator motor 102, and a battery 104 mounted on the vehicle is connected to the power control unit 103.

The storage battery 104 may be one that is used together with other vehicle loads, or one that is exclusively used for the generator motor 102.

Here, note that the relation among the generator motor 102, the power control unit 103 and the battery 104 is as shown by a solid line arrow in case where the generator motor 102 operates as a generator, and it is as shown by a broken line arrow in case where the generator motor 102 operates as an electric motor.

A rotation speed detection part 105 is provided on the generator motor 102 for detecting the rotational speed Na of the generator motor 102, and a voltage detection part 106 is provided on the battery 106 for detecting a battery voltage VB.

The rotational speed Na of the generator motor 102 and the battery voltage VB are input to the power control unit 103 together with unillustrated other various kinds of sensor information.

The power control unit 103 supplies, in response to a starting request signal (not shown) from the vehicle for example, a current to the generator motor 102 so as to generate torque in the same direction as the rotational direction of the internal combustion engine 101, thereby making the generator motor 102 operate as an electric motor.

In addition, if the rotational speed Na of the generator motor 102 is higher than the reference rotational speed (e.g., about 1,000 r/min) in a state of the starting request signal being off, the power control unit 103 makes the generator motor 102 operate as a generator.

Further, the generator motor 102 has a plurality of power generating operation modes when operating as an electric motor, and the power generating operation modes of the generator motor 102 are selectively decided in accordance with a determination result of a microcomputer (not shown) including the power control unit 103.

That is, the microcomputer including the power control unit 103 supplies a compensation current for phase control to the mature winding of the generator motor 102 when the rotational speed Na of the generator motor 102 is less than or equal to a first predetermined rotational speed (e.g., 1,500 r/min), whereby the power generating operation is controlled in an inverter power generation mode (hereinafter referred to as a "first mode") by supplying an energization current to the field winding of the generator motor 102.

In addition, when the rotational speed Na of the generator motor 102 is higher than the first predetermined rotational speed, the power control unit 103 controls the power generating operation in an alternator generation mode (hereinafter referred to as a "second mode") according to field duty control that controls the energization current to the field winding, as in a conventional vehicular generator.

Next, reference will be made to a specific construction of the power control unit 103 in FIG. 1.

Figure 2:
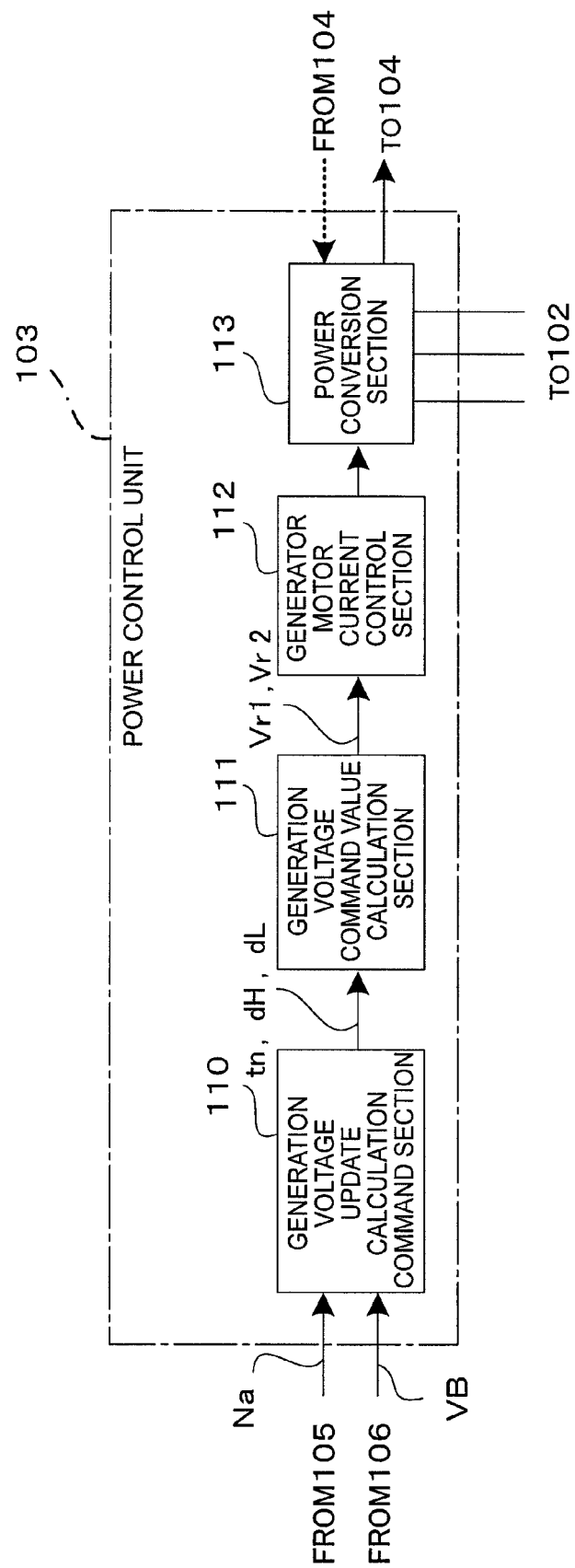
FIG. 2 is a functional block diagram illustrating a specific construction example of a power control unit in FIG. 1 (embodiment 1).

FIG. 2 is a functional block diagram that shows an example of the specific construction of the power control unit 103 according to the first embodiment of the present invention.

In FIG. 2, the power control unit 103 includes a generation voltage update calculation command section 110 that commands or instructs update calculation of the generated voltage, a generation voltage command value calculation section 111 that calculates generation voltage command values Vr1, Vr2 for the first and second modes, respectively, a generator motor current control section 112 that controls a field winding current and an armature winding current of the generator motor 102, and a power conversion section 113 in the form of a three-phase inverter circuit that operates under the control of the generator motor current control section 112.

As shown in later mentioned flow charts (see FIG. 4 and FIG. 5), the generation voltage update calculation command section 110 calculates, based on the state of the generator motor 102 (the rotational speed Na), the state of the battery 104 (the battery voltage VB), etc., the next generation voltage command update timing (hereinafter simply abbreviated as "update timing") tn, an amount of increase dH and an amount of decrease dL with respect to the generation voltage command value Vr at each predetermined time (e.g., 10 msec), and commands or instructs the next update timing tn, the amount of increase dH and the amount of decrease dL of the generation voltage command value Vr to the generation voltage command value calculation section 111.

Figure 6:
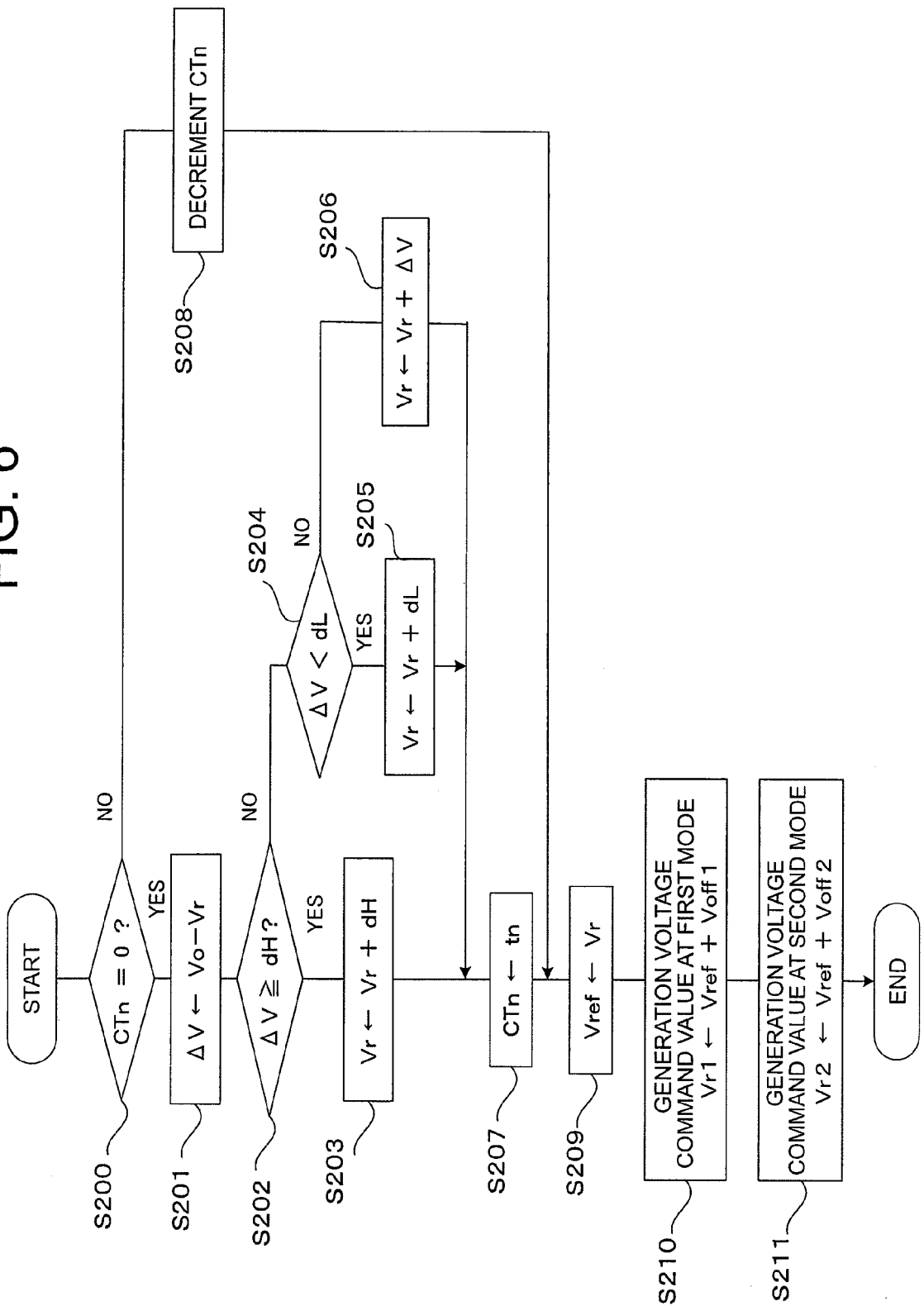
FIG. 6 is a flow chart showing a specific processing operation of a power generation voltage command value calculation section in FIG. 2 (embodiment 1).

The generation voltage command value calculation section 111 sets current generation voltage command value Vr1 or Vr2 with respect to the first and second modes, respectively, so as to follow a final target value Vo of the generation voltage to the battery 104, as shown in the under-mentioned flow chart (see FIG. 6).

That is, the generation voltage command value calculation section 111 calculates the current generation voltage command values Vr1, Vr2 based on the update timing tn, the amount of increase dH and the amount of decrease dL of the generation voltage command value Vr decided by the generation voltage update calculation command section 110.

At this time, offset voltages Voff1, Voff2 for the first and second modes, respectively, are individually added to the generation voltage command value Vr in the individual modes to provide the generation voltage command values Vr1, Vr2 in the individual modes, respectively.

Next, reference will be made to a specific construction of the power conversion section 113 in FIG. 2.

Figure 3:
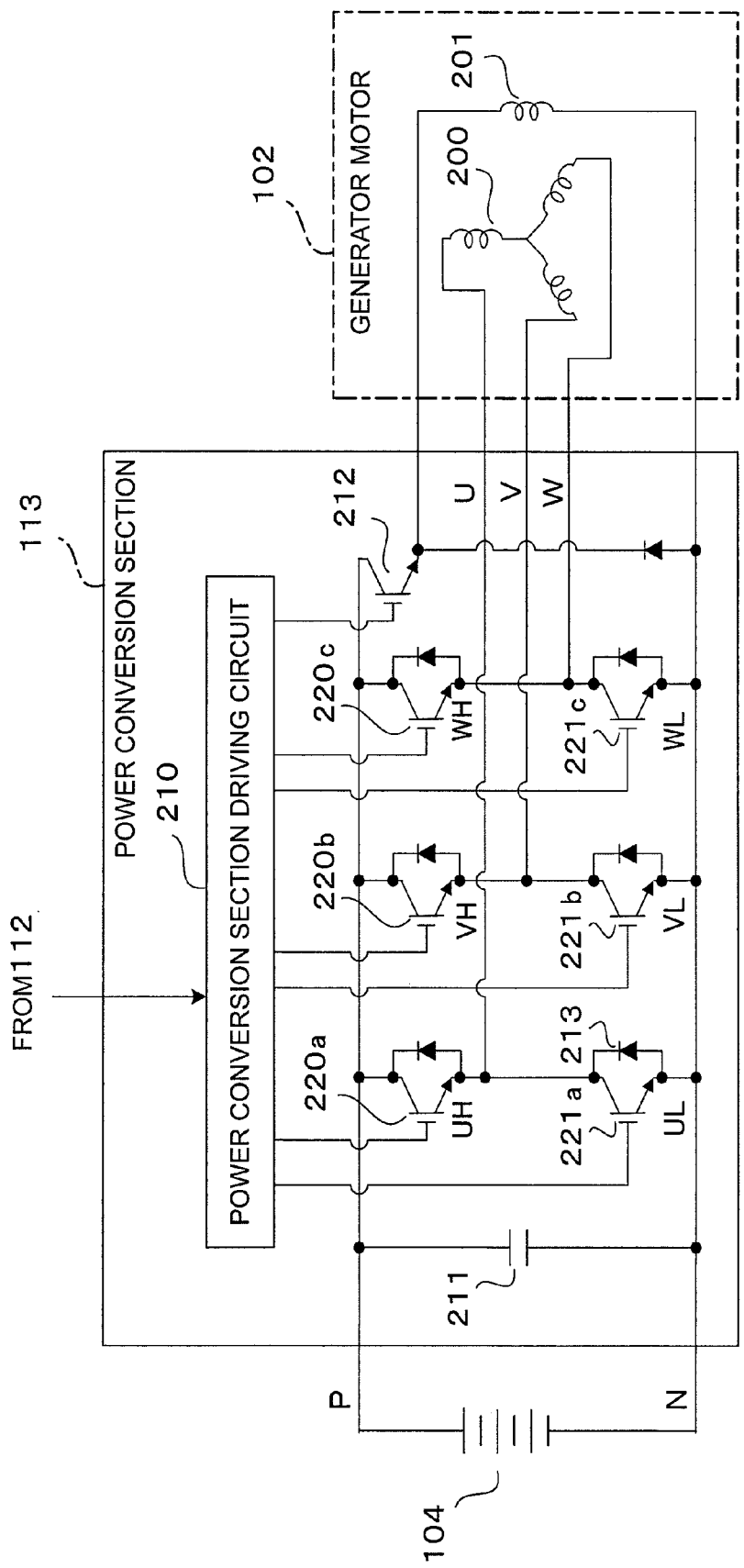
FIG. 3 is a circuit diagram showing a specific construction example of a power conversion section in FIG. 2 together with a generator motor (embodiment 1).

FIG. 3 is a circuit diagram that shows a specific construction example of the power conversion section 113 in FIG. 2 together with the generator motor 102.

In FIG. 3, the generator motor 102 is provided with an armature winding 200 of three phases (U, V and W phase) Y-connected with one another (or Δ-connected with one another), and a field winding 201 that is arranged in opposition to the armature winding 200.

The power conversion section 113 is provided with a power conversion section driving circuit 210 that is operated under the control of the generator motor current control section 112, and a three-phase inverter circuit that is interposed between the generator motor 102 of three phases (U, V, W) and the direct current battery 104 (with two poles P, N).

The three-phase inverter circuit comprises a smoothing capacitor 211 that is connected to the battery 104, a field winding current switching element 212 that is connected to the field winding 201, six power conversion switching elements 220a through 220c and 221a through 221c, and freewheel diodes 213 that are individually connected in antiparallel to the individual power conversion switching elements, respectively.

The three power conversion switching elements 220a through 220c and the three corresponding power conversion switching elements 221a through 221c are individually connected to each other, as shown in FIG. 3, to form three pairs of series circuits.

The individual series circuits of the power conversion switching elements are inserted, in parallel to one another, between the power supply lines P, N of the battery 104, and junctions of the individual series circuits are connected to the individual phases (U, V, W) of the armature winding 200, respectively.

That is, the power conversion switching elements 220a through 220c at high voltage sides of individual series circuits are connected to the power supply line P to form the switching elements of UH, VH and WH phases, respectively, and the power conversion switching elements 221a through 221c at low voltage sides of the individual series circuits are connected to the power supply line N to form the switching elements of UL, VL and WL phases.

The power conversion section driving circuit 210 drives the individual power conversion switching elements and the field winding current switching element 212 to turn on and off by controlling gates of the individual power conversion switching elements 220a through 220c, 221a through 221c and a gate of the field winding current switching element 212, whereby the current to the armature winding 200 and the current to the field winding 201 are controlled to desired target values, respectively.

Now, reference will be made to the operation of the generator motor current control section 112.

First of all, in case of the first mode, of the generator motor current control section 112 energizes the generator motor 102 through the power conversion section 113 so as to make the generated voltage coincide with the generation voltage command value Vr1 in the first mode calculated by the generation voltage command value calculation section 111.

That is, an electric power generation command amount is calculated based on a deviation between the battery voltage VB and the generation voltage command value Vr1 (by using well-known PI control, etc.), so that an armature winding current and a field winding current are supplied to the generation motor who 102 so as to make an amount of electric power generation coincide with the electric power generation command amount.

In addition, in case of the second mode, the generator motor current control section 112 energizes the generator motor 102 through the power conversion section 113 so as to make the amount of electric power generation coincide with the generation voltage command value Vr2 in the second mode calculated by the generation voltage command value calculation section 111.

That is, the generator motor current control section 112 calculates the energization current (field duty) to the field winding 201 in accordance with a deviation between the battery voltage VB and the generation voltage command value Vr2, and supplies a field winding current thus calculated to the generator motor 102 through the power conversion section 113.

Hereinafter, reference will be made to specific processing operations of the generation voltage update calculation command section 110 and the generation voltage command value calculation section 111 according to the first embodiment of the present invention while referring to flow charts in FIGS. 4 through 6 together with FIGS. 1 through 3.

First, the operation of the generation voltage update calculation command section 110 in FIG. 2 will be described while referring to FIGS. 4 and 5.

Figure 4:
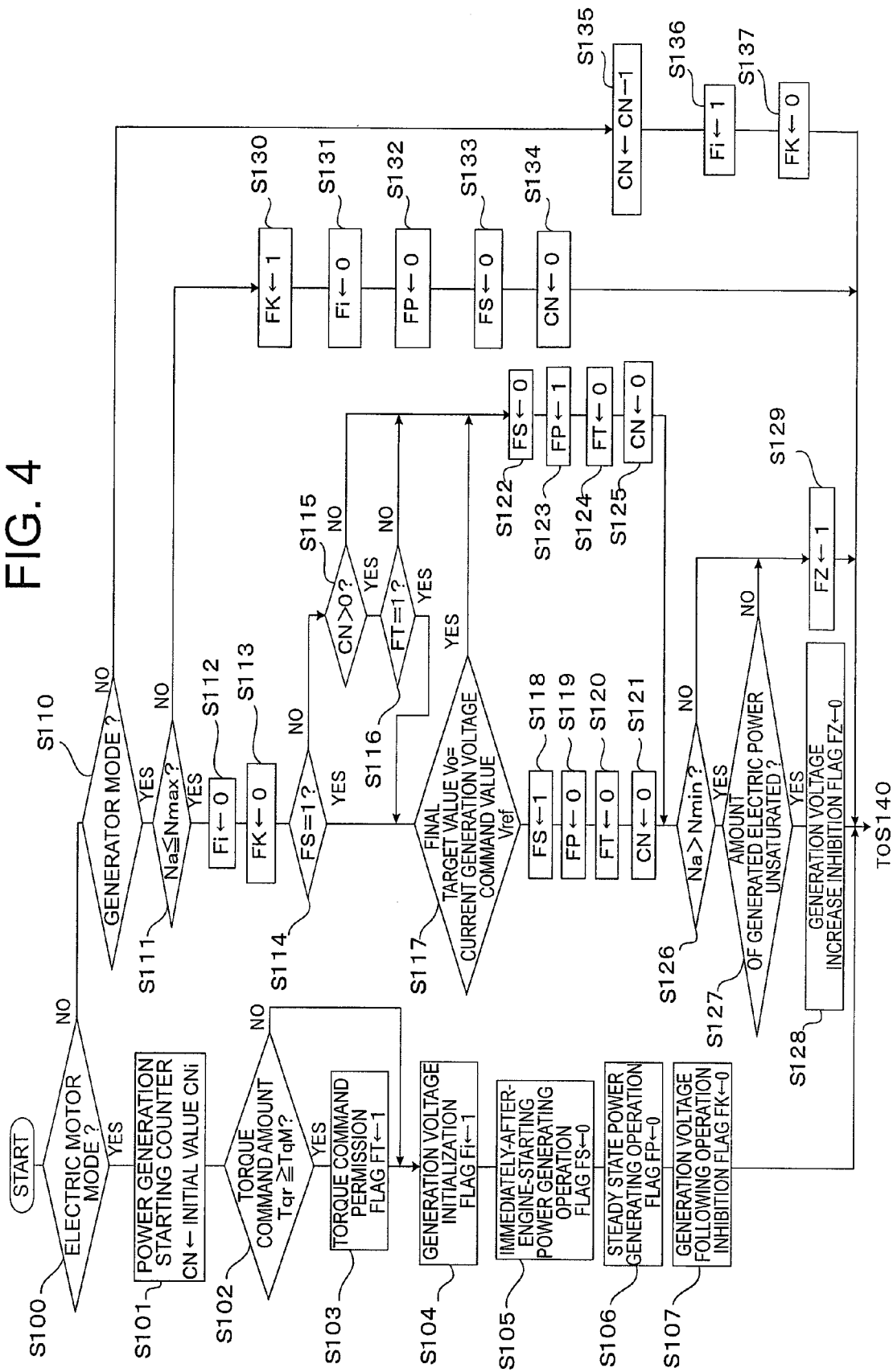
FIG. 4 is a flow chart showing a first half of a processing operation of a power generation voltage update calculation command section in FIG. 2 (embodiment 1).

In FIG. 4, first of all, the generation voltage update calculation command section 110 determines whether the generator motor 102 currently operates in an electric motor mode (step S100), and when it is determined that the generator motor does not operate in an electric motor mode (that is, NO), the control flow proceeds to step S110 (to be described later).

On the other hand, when it is determined in step S100 that the generator motor operates in an electric motor mode (that is, YES), an initial value CNi (e.g., 5 sec.) is assigned to a power generation starting counter CN (for measuring a time from the end of the operation of an electric motor to the start of a power generating operation) (step S101).

Subsequently, it is determined whether a current torque command amount Tqr for the generator motor 102 is more than or equal to a predetermined torque TqM (step S102), and when it is determined as Tqr<TqM (that is, NO), the control flow proceeds to step S104.

On the other hand, when it is determined as Tqr≧TqM in step S102 (that is, YES), a torque command permission flag FT is set to 1 (i.e., "FT←1") (step S103), after which the control flow proceeds to step S104.

Here, note that the torque command amount Tqr is substantially proportional to the amount of electric power supplied to the armature winding 200 and the field winding 201 of the generator motor 102, and in addition, the amount of electric power to the armature winding 200 and the field winding 201 is substantially proportional to the amount of electric power supplied from the battery 104.

That is, the predetermined torque TqM, being a comparison reference for the torque command amount Tqr, relates to the amount of electric power supplied by the battery 104, and to set the amount of electric power supplied from the battery 104 when a power generating operation is required immediately after engine starting is equivalent to setting the predetermined torque TqM.

Subsequently, a generation voltage initialization flag Fi to identify whether the generation voltage should be initialized is set to 1 (i.e., "Fi←1") (step S104), and an immediately-after-engine-starting power generating operation flag FS to identify whether it is a power generating operation immediately after engine starting is cleared to 0 (i.e., "FS←0") (step S105). Thereafter, a steady state power generating operation flag FP to identify whether it is a power generating operation in a steady state is cleared to 0 (i.e., "FP←0") (step S106), and a generation voltage following operation inhibition flag FK to identify whether a generation voltage following operation should be executed is cleared to 0 (i.e., "FK←0") (step S107), after which the control flow proceeds to step S140 in FIG. 5.

On the other hand, when it is determined in step S100 that the generator motor 102 does not currently operate in an electric motor mode (that is, NO), it is subsequently determined whether the generator motor 102 operates in a generator mode (step S110).

When it is determined in step S110 that the generator motor operates as an electric motor (that is, YES), it is determined whether the current rotational speed Na of the generator motor 102 is less than or equal to a second predetermined rotational speed Nmax (step S111).

Here, the second predetermined rotational speed Nmax is decided by a balance between a positive torque generated by the internal combustion engine 101 and a negative torque generated by the generator motor 102 during its power generating operation, and is selected in such a manner that the negative torque of the generator motor 102 results in a sufficiently small rotational speed as compared with the positive torque generated by the internal combustion engine 101 even in a maximum power generation state, i.e., is selected into a rotational speed that does not require load response control.

When it is determined as Na≦Nmax in step S111 (that is, YES), the generation voltage initialization flag Fi is cleared to 0 (i.e., "Fi←0") so as to execute a generation voltage following operation (step S112), and the generation voltage following operation inhibition flag FK is cleared to 0 (i.e., "FK←0") (step S113).

Subsequently, depending upon whether the immediately-after-engine-starting power generating operation flag FS is set, it is determined whether a current state is in the power generating operation immediately after engine starting (step S114).

When it is determined as FS=0 in step S114 and hence that the current state is not in the power generating operation immediately after engine starting (that is, NO), determination processing is executed as to whether the current state can be shifted to the power generating operation immediately after engine starting (steps S115, S116).

That is, first, depending upon whether the value of the power generation starting counter CN is a value before the end of a countdown (CN>0), it is determined whether a time from engine starting until the start of power generation is within a predetermined time (step S115), and when it is determined as CN1=0 (that is, NO), the control flow advances to step 122 (to be described later).

On the other hand, when it is determined as CN>0 in step S115 (that is, YES), it is subsequently determined whether the torque command permission flag FT is set to 1 (i.e., "FT=1"), for the purpose of determining an amount of current taken out or supplied from the battery 104 based on the torque command amount Tqr (step S116).

When it is determined as FT=0 in step 116 (that is, NO), the control flow proceeds to step 122, whereas when determined FT=1 (that is, YES), the control flow proceeds to step S117.

Thus, when both of the conditions of steps 115 and S116 are satisfied, a determination is made that the current state has changed into a state immediately after engine starting, and when it is determined that it is a power generating operation immediately after engine starting, it is determined, depending on whether the final target value Vo of the generation voltage is equal to a current generation voltage command value Vref, whether the power generating operation immediately after engine starting can be continued (step S117).

When it is determined as Vo≠Vref in step S117 (that is, NO), the immediately-after-engine-starting power generating operation flag FS is set to 1 (i.e., "FS←1") so as to execute a power generating operation immediately after engine starting (step S118). Then, the steady state power generating operation flag FP is cleared to 0 (i.e., "FP←0") (step S119), and the torque command permission flag FT is cleared to 0 (i.e., "FT←0") (step S120), and the power generation starting counter CN is cleared to 0 (step S121), after which the control flow proceeds to step S126.

On the other hand, when it is determined as Vo=Vref in step S117 (that is, YES), the current state is under a condition which is not the power generating operation after engine starting, as in the case where the determination condition in step S115 or step S116 is not satisfied, so the immediately-after-engine-starting power generating operation flag FS is cleared to 0 (i.e., "FS←0") so as to make the current state function as a steady state power generating operation (step S122). Then, the steady state power generating operation flag FP is set to 1 (i.e., "FP←1") (step S123), and the torque command permission flag FT is cleared to 0 (i.e., "FT←0") (step S124), and the power generation starting counter CN is cleared to 0 (step S125), after which the control flow proceeds to step S126.

Subsequently, it is determined whether the current rotational speed Ne is greater than a third predetermined rotational speed Nmin (step S126).

At this time, the third predetermined rotational speed Nmin is set to a rotational speed at which electric power generation can be made but the stalling of the internal combustion engine 101 might be induced if the power generation is continued as it is. Alternatively, a rotational speed less than or equal to a power generation starting rotational speed of the generator motor 102 (reference rotational speed=1,000 r/min) may be selected as the third predetermined rotational speed Nmin.

By way of example, in case where the idle rotational speed of the internal combustion engine 101 is 750 r/min, and the pulley ratio of the internal combustion engine 101 to the generator motor 102 is "2", and the reference rotational speed at which the generator motor 102 operates as a generator is 1,000 r/min (i.e., 500 r/min in terms of the rotational speed of the internal combustion engine 101), the first predetermined rotational speed for the rotational speed Na of the generator motor 102 can be set to 2,000 r/min (1,000 r/min in terms of the rotational speed of the internal combustion engine 101), the second predetermined rotational speed Nmax can be set to 4,000 r/min (2,000 r/min in terms of the rotational speed of the internal combustion engine 101), and the third predetermined rotational speed Nmin can be set to 1,300 r/min (650 r/min in terms of the rotational speed of the internal combustion engine 101).

Although in the above example, as a generator, a power generating operation can be made up to a low speed rotation region of Na=1,000 r/min, there is a possibility that an engine stall occurs due to the power generation load torque of the generator motor 102 if the power generating operation is performed up to the limitation of a lower limit rotational speed.

Accordingly, an update operation of the generation voltage is inhibited by a determination condition in step S126.

Here, note that the set values of the individual rotational speeds may be arbitrarily changed in accordance with design conditions of the internal combustion engine 101 or the like.

In addition, it is seen from a torque characteristic of the internal combustion engine 101 that when the engine rotational speed corresponding to the second predetermined rotational speed Nmax (=4,000 r/min) is 2,000 r/min as stated above, the generated torque of the internal combustion engine 101 is remarkably larger than the generated torque of the generator motor 102, so the generated voltage may be operated according to an indicated value (a power generation command amount).

When it is determined as Na>Nmin in step S126 (that is, YES), a determination is subsequently made as to whether the amount of electric power generated by the generator motor 102 is in an unsaturated state, so as to determine the current power generation state thereof (step S127).

At this time, for example, in case of the first mode, a determination reference in step S127 corresponds to a determination reference based on which it is determined whether the power generation command amount is saturated, or whether a permissible temperature is exceeded, whereas in case of the second mode, it corresponds to a determination reference based on which it is determined whether the field duty has reached 100%, or whether the field winding current or the armature winding current exceeds a permissible value or whether a permissible temperature is exceeded, or the like.

Figure 5:
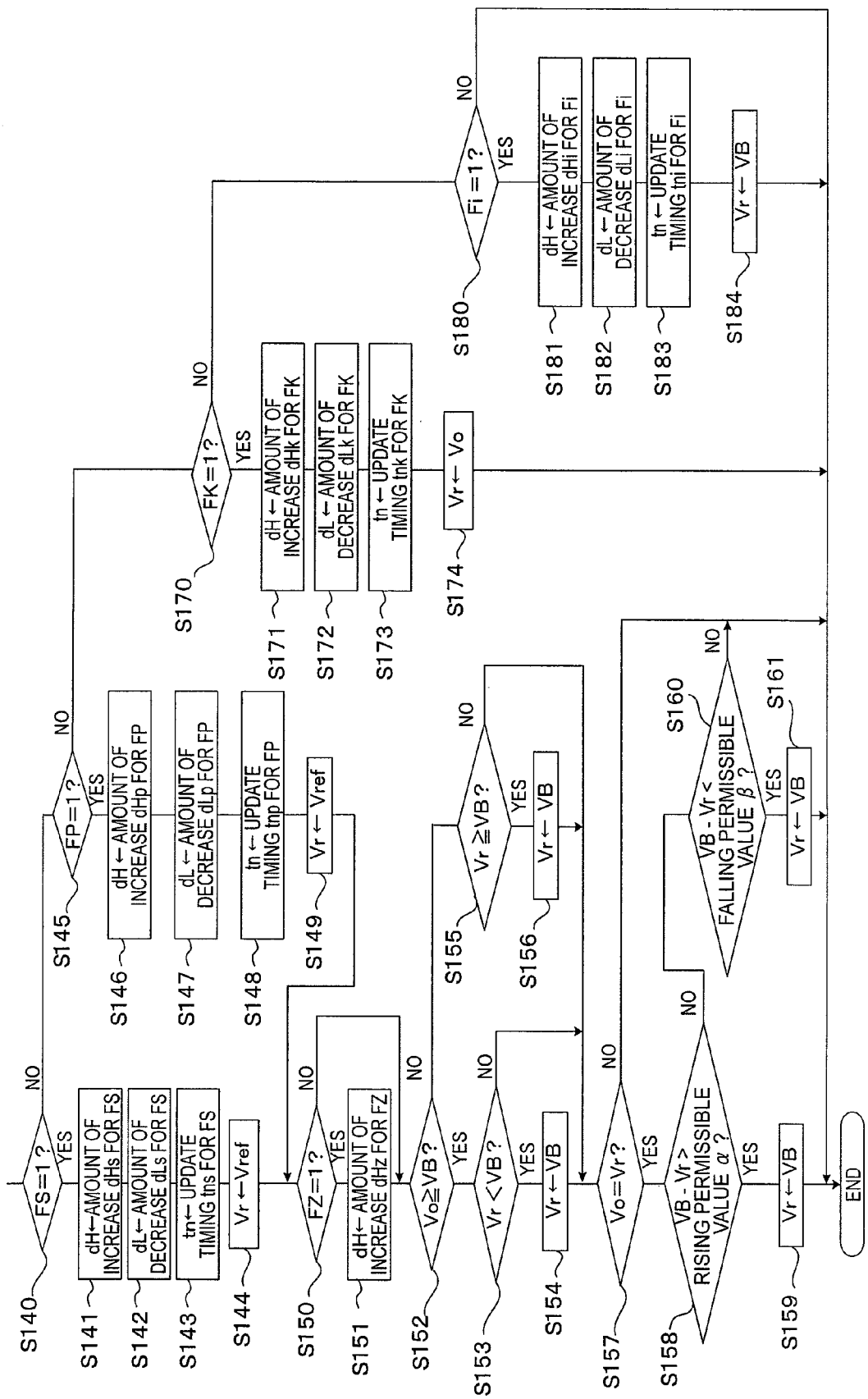
FIG. 5 is a flow chart showing a second half of the processing operation of the power generation voltage update calculation command section in FIG. 2 (embodiment 1).

When it is determined in step S102 that the amount of electric power generated by the generation motor 102 is unsaturated (that is, YES), a generation voltage increase inhibition flag FZ is cleared to 0 (i.e., "FZ←0") (step S128), and the control flow proceeds to step S140 in FIG. 5.

That is, when both of the determination conditions in step S126 and step S127 are satisfied, the control flow proceeds to step S128.

On the other hand, when the determination condition is not satisfied in either step S126 or S127, i.e., when it is determined as Na≦Nmin in step S126 (that is, NO), or when it is determined in step S127 (that is, NO) that the amount of electric power generated is saturated, the generation voltage increase inhibition flag FZ to identify the inhibition of increase of the current generation voltage command value Vref is set to 1 (i.e., "FZ←1") (step S129), and the control flow proceeds to step S140.

When it is determined as Na>Nmax in step S111 (that is, NO), a positive torque generated by the internal combustion engine 101 is large to a satisfactory extent, so the generation voltage following operation inhibition flag FK is set to 1 (i.e., "FK←1") so as to stop the load response control to immediately set the current generation voltage command value Vref to the final target value Vo of the generation voltage (step S130), and the generation voltage initialization flag Fi is cleared to 0 (i.e., "Fi←0") (step S131). Then, the steady state power generating operation flag FP is cleared (step S132), the immediately-after-engine-starting power generating operation flag FS is cleared (step S133), and the power generation starting counter CN is cleared to 0 (step S134), after which the control flow proceeds to step S140.

Further, if it is determined in the above-mentioned step S110 that the operating state of the generator motor 102 is not in the generator mode (that is, NO), down-count processing (subtraction by 1) of the power generation starting counter CN is executed (step S135), the generation voltage initialization flag Fi is set to 1 (i.e., "Fi←1") (step S136), and the generation voltage following operation inhibition flag FK is cleared to 0 (i.e., "FK←0") (step S137), after which the control flow proceeds to step S140.

Here, note that in the case of the power generation starting counter CN=0, subtraction processing in step S135 is of course not executed, and the power generation starting counter is held as it is (i.e., CN=0).

Next, reference will be made to the second half (from step S140 onward) of the processing of the generation voltage update calculation command section 110 while referring to FIG. 5.

In FIG. 5, the update timing tn, the amount of increase dH and the amount of decrease dL of the generation voltage command value Vr, and the current generation voltage command value Vref, which are to be transferred to the generation voltage command value calculation section 111, are calculated based on the states of the various flags FS, FP, FK and Fi decided in the first half (steps S100 through S137 in FIG. 4).

First of all, depending upon whether the immediately-after-engine-starting power generating operation flag FS is set, it is determined whether the current state of the generator motor is in a power generating operation immediately after engine starting (step S140).

When it is determined as FS=0 in step S140 (that is, NO), it is subsequently determined, depending upon whether the steady state power generating operation flag FP is set, whether the current state is in a steady state power generating operation (step S145).

When it is determined as FP=0 in step S145 (that is, NO), it is subsequently determined, depending upon whether the generation voltage following operation inhibition flag FK is set to 1 (FK=1), whether the generation voltage following operation is to be inhibited (step S170).

On the other hand, when it is determined as FK=0 in step S170 (that is, NO), it is subsequently determined, depending upon whether the generation voltage initialization flag Fi is set to 1 (Fi=1), whether the initialization of the generated voltage is to be executed (step S180). In this manner, four types of flag determination processing are executed.

When it is determined as FS=1 in the above step S140 (during power generating operation immediately after engine starting) (that is, YES), an amount of increase dHs and an amount of decrease dLs for the immediately-after-engine-starting power generating operation flag FS are assigned as the amount of increase dH and the amount of decrease dL of the generation voltage command value Vr, respectively (steps S141, S142).

Similarly, an update timing tns for the immediately-after-engine-starting power generating operation flag FS is assigned as the update timing to (step S143).

Here, note that the individual set values dHs, dLs and tns may be those values which are beforehand defined in the off-line, or may be those values which are changed in real time by means of a communication device, etc., from an ECU (not shown) that manages the state of the vehicle.

Subsequently, the current generation voltage command value Vref is assigned as the generation voltage command value Vr (step S144), and the control flow proceeds to the following determination step S150 (to be described later).

On the other hand, when it is determined as FS=0 in the above step S140 (not during power generating operation immediately after engine starting) (that is, NO), and subsequently when it is determined as FP=1 in the above step S145 (during the steady state power generating operation) (that is, YES), an amount of increase dHp and an amount of decrease dLp for the steady state power generating operation flag FP are assigned as the amount of increase dH and the amount of decrease dL of the generation voltage command value Vr, respectively (steps S146, S147), and an update timing tnp for the steady state power generating operation flag FP is assigned as the update timing to (step S148).

Here, note that the individual set values dHs, dLs and tns may be those values which are beforehand defined in the off-line, as stated above, and may be those values which can be changed in real time by means of a communication device, etc.

Subsequently, the current generation voltage command value Vref is assigned as the generation voltage command value Vr (step S149), and the control flow proceeds to the following determination step S150.

When the current generation voltage command value Vref is assigned as the generation voltage command value Vr, as in the above steps S144, S149, it is subsequently determined whether the generation voltage increase inhibition flag FZ is set to 1 (FZ=1) (step S150).

When it is determined as FZ=1 in step S150 (a generation voltage increase is inhibited) (that is, YES), an amount of increase dHz for the generation voltage increase inhibition flag FZ is set as the amount of increase dH of the generation voltage command value Vr (step S151).

The amount of increase dHz for FZ is set to a value substantially equal to "0" in order to inhibit a generation voltage increase. Here, note that this value dHz (substantially "0") may be simply set to 0 (i.e., "dH=0") for example in step S151 without defining it in a ROM in the ECU, etc.

Also, the amount of decrease dL and the update timing to of the generation voltage need not be rewritten into values for FZ.

On the other hand, when it is determined as FZ=0 in step S150 (that is, NO), the control flow proceeds to step S152 without executing step S151.

Subsequently, depending upon whether the current battery voltage VB is less than or equal to the final target value Vo of the generation voltage, it is determined whether the battery voltage VB rises toward the final target value Vo (step S152).

When it is determined as Vo≧VB in step S152 (the battery voltage VB is rising toward the final target value Vo) (that is, YES), a comparison is subsequently made between the generation voltage command value Vr (=the current generation voltage command value Vref) and the battery voltage VB, so that it is determined whether the generation voltage command value Vr is lower than the battery voltage VB (step S153).

When it is determined as Vr<VB in step S153 (that is, YES), the battery voltage VB is set as the generation voltage command value Vr (step S154), and the control flow proceeds to the following determination step S157 (to be described later).

On the other hand, when it is determined as Vr≧VB in step S153 (that is, NO), the control flow proceeds to step S157 without executing step S154.

In general, when the battery voltage VB is rising toward the final target value Vo of the generation voltage, a relation of Vo>Vref>VB holds, but there can sometimes be a relation of Vo>VB>Vref resulting from an electric load variation of the vehicle or the like.

Accordingly, when Vr<VB, the battery voltage VB is set as the generation voltage command value Vr, as in step S154.

On the other hand, when it is determined as Vo<VB in the above step S152 (the battery voltage VB is rising toward the final target value Vo) (that is, NO), it is subsequently determined whether the generation voltage command value Vr (=the current generation voltage command value Vref) is higher than or equal to the battery voltage VB (step S155).

When it is determined as Vr≧VB in step S155 (that is, YES), the battery voltage VB is set as the generation voltage command value Vr (step S156), and the control flow proceeds to step S157.

On the other hand, when it is determined as Vr<VB in step S155 (that is, NO), the control flow proceeds to step S157 without executing step S156.

As stated above, in general, when it is determined that the battery voltage VB is falling toward the final target value Vo, a relation of Vo<Vref<VB holds, but when determined as VB<Vref in step S155, the battery voltage VB is set as the generation voltage command value Vr, as in step S156.

Then, it is determined whether the final target value Vo and the generation voltage command value Vr (=the current generation voltage command value Vref) coincide with each other (step S157), and when determined as Vo≠Vr (that is, NO), a processing routine of FIG. 5 is terminated.

On the other hand, when it is determined as Vo=Vr in step S157 (that is, YES), it is subsequently determined whether a subtraction value (=VB−Vr), which is obtained by subtracting the generation voltage command value Vr from the battery voltage VB, is larger than a rising permissible value α of the generation voltage (step S158).

When it is determined as VB−Vr>α in step S158 (that is, YES), the battery voltage VB is set as the generation voltage command value Vr (step S159), and the processing routine of FIG. 5 is terminated.

On the other hand, when it is determined as VB−Vr≦α in step S158 (that is, NO), it is subsequently determined whether the subtraction value (=VB−Vr) is smaller than a falling permissible value β of the generated voltage (step S160).

When it is determined as VB−Vr<β in step S160 (that is, YES), the battery voltage VB is set as the generation voltage command value Vr (step S161), and the processing routine of FIG. 5 is terminated.

On the other hand, when it is determined as VB−Vr≧β in step S160 (that is, NO), the processing routine of FIG. 5 is terminated without executing step S161.

As a result, only when the battery voltage VB is changed due to a rapid variation in the vehicle load or the like in a stable state, i.e., Vo=Vr (=Vref), the current generation voltage command value Vref is caused to once rise (or fall) to the thus changed battery voltage VB, thereby executing a follow-up operation of the generation voltage.

Here, note that the rising permissible value α and the falling permissible value β of the generation voltage may be values defined in the ROM, or values that can be changed in real time in accordance with the state of the vehicle by means of a communication device or the like, as stated above.

On the other hand, when it is determined as FP=0 in the above step S145 (not during the steady-state power generating operation), and subsequently when it is determined as FK=1 in step S170 (i.e., the generation voltage following operation is inhibited), the amount of increase dHk, the amount of decrease dLk and the update timing tnk for the generation voltage following operation inhibition flag FK are assigned as the amount of increase dH, the amount of decrease dL and the update timing to of the generation voltage command value Vr, respectively (steps S171, S172 and S173).

Also, the final target value Vo is set as the generation voltage command value Vr (step S174), and the processing routine of FIG. 5 is terminated.

In this case, since the final target value Vo is set as the generation voltage command value Vr (step S174), neither the amount of increase dH nor the amount of decrease dL make sense, but sufficiently large values are set as the amount of increase dH and the amount of decrease dL.

In addition, the amount of increase dH and the amount of decrease dL need not be particularly defined in the ROM, and for example, the processing of setting these amounts to large values such as H (hex) "7FFF" may be applied.

On the other hand, when it is determined as FK=0 in the above step S170 (i.e., the generation voltage following operation is not inhibited), it is subsequently determined whether Fi=1 (i.e., the initialization of the generated voltage is executed) (step S180).

When it is determined as Fi=1 in step S180 (that is, YES), the amount of increase dHi, the amount of decrease dLi and the update timing tni for the generation voltage initialization flag Fi are assigned as the amount of increase dH, the amount of decrease dL and the update timing to (steps S181, S182 and S183), and the current battery voltage VB is set as the generation voltage command value Vr (step S184), after which the processing routine of FIG. 5 is terminated.

Here, note that the case where the relation of Fi=1 holds in step S180 corresponds to cases where the processing step S104 or S136 in the generator mode in FIG. 4 is executed.

In addition, it is assumed that the amount of increase dH and the amount of decrease dL are set to values substantially equal to "0".

With the above, the description of the operation of the generation voltage update calculation command section 110 (see FIG. 2) in the power control unit 103 is finished.

Next, detailed reference will be made to the operation of the generation voltage command value calculation section 111 (see FIG. 2) in the power control unit 103 while referring to a flow chart in FIG. 6.

In FIG. 6, the generation voltage command value calculation section 111 calculates the generation voltage command values Vr1, Vr2 in the first and second modes based on the amount of increase dH, the amount of decrease dL, the update timing tn, and the generation voltage command value Vr set by the generation voltage update calculation command section 110.

First of all, depending upon whether the timing counter CTn is cleared to zero, it is determined whether update processing of the generation voltage command value Vr (steps S201 through S206) according to a current calculation loop is to be executed (step S200).

When it is determined as CTn>0 in step S200 (i.e., the generation voltage update processing is not executed in the current calculation loop) (that is, NO), the timing counter CTn is decremented (subtracted by 1) (step S208), and the control flow proceeds to step S209 (to be described later).

On the other hand, when it is determined as CTn=0 in step S200 (that is, YES), the update processing of the generation voltage command value Vr is executed (steps S201 through S206).

Here, note that in the following steps S207 to be described later, the value of the update timing tn is set as the value of the timing counter CTn, but the update timing tn is set to a value corresponding to a period of execution of the generation voltage command value calculation section 111.

For example, if the period of execution of the generation voltage command value calculation section 111 is 10 msec and the value of the update timing tn is "5", update calculation processing of the generation voltage command value (steps S201 through S206) according to FIG. 6 is executed once per 50 msec.

In addition, the value of the timing counter CTn may be cleared to zero upon initial setting, or it may be cleared to zero, following the step S134 upon setting of the above-mentioned generation voltage following operation inhibition flag FK (see FIG. 4).

Also, in case where the update calculation processing of FIG. 6 is not to be executed upon initial setting, the timing counter CTn may be initially set to an arbitrary value beforehand.

When it is determined as CTn=0 in step S200 (i.e., the update processing of the generation voltage command value Vr is executed in the current calculation loop), first of all, a difference $\Delta V$ (=Vo−Vr) between the final target value Vo of the generation voltage and the generation voltage command value Vr is calculated (step S201).

Subsequently, the difference $\Delta V$ and the amount of increase dH are compared with each other, so that it is determined whether the difference $\Delta V$ is larger than or equal to the amount of increase dH (step S202).

When it is determined as $\Delta V$ dH in step S202 (that is, YES), the amount of increase dH is added to the generation voltage command value Vr (step S203), and the control flow proceeds to step S207.

On the other hand, when it is determined as $\Delta V$<dH in step S202 (that is, NO), the difference $\Delta V$ and the amount of decrease dL are subsequently compared with each other, so that it is determined whether the difference $\Delta V$ is less than the amount of decrease dL (step S204).

When it is determined as $\Delta V$<dL in step S204 (that is, YES), the amount of decrease dL is added to the generation voltage command value Vr (step S205), and the control flow proceeds to step S207.

On the other hand, when the difference $\Delta V$ does not satisfy either of the determination conditions in steps S202, 204 and it is determined as $\Delta V \geq dL$ in step S204 (that is, NO), the difference $\Delta V$ is added to the generation voltage command value Vr (step S206), and the control flow proceeds to step S207.

In step S206, if the amount of increase dH or the amount of decrease dL is added to the generation voltage command value Vr, the final target value Vo will be exceeded by the result thus obtained, so the difference $\Delta V$ is added to the generation voltage command value Vr.

Then, the value of the update timing to is set as the value of the timing counter CTn (step S207), and the generation voltage command value Vr acquired in the above-mentioned processing (steps S203, S205 and S206) is set as the current generation voltage command value Vref (step S209).

Finally, the generation voltage command values Vr1, Vr2 corresponding to a plurality of power generating operation modes (the first and second modes) are calculated (steps S210, S211), and the processing routine of FIG. 6 is terminated.

That is, in step S210, the generation voltage command value Vr1 at the first mode is calculated by adding an offset voltage Voff1 at the first mode to the current generation voltage command value Vref.

Similarly, in step S211, the generation voltage command value Vr2 at the second mode is calculated by adding an offset voltage Voff2 at the second mode to the current generation voltage command value Vref.

Here, note that the offset voltages Voff1, Voff2 in the individual modes may be constant with respect to the rotational speed Na or the amount of generated electric power of the generator motor 102a, or may be changed with a predetermined slope.

As described above, the power generation control apparatus of a rotating electrical machine for a vehicle according to the first embodiment of the present invention includes the power control unit 103 that has the armature winding 200 and the field winding 201 and is connected with the generator motor 102 so as to control the generator motor 102 (rotating electrical machine) which is mechanically coupled with the internal combustion engine 101 for the vehicle and operates at least as a generator, the battery 104 (storage battery) that delivers and receives electric power to and from the generator motor 102 through the power control unit 103, and the rotation speed detection part that detects the rotational speed Na of the generator motor 102.

In addition, when the rotational speed Na of the generator motor 102 is less than or equal to the first predetermined rotational speed during an operation of the generator motor 102 as a generator, the power control unit 103 controls the power generating operation of the generator motor 102 in the first mode based on a compensation current for phase control to the armature winding 200 and an energization current to the field winding 201, whereas when the rotational speed Na of the generator motor 102 is higher than the first predetermined rotational speed, it controls the power generating operation of the generator motor 102 in the second mode based on a field duty that controls the energization current to the field winding 201.

Further, the power control unit 103 includes the generation voltage command value calculation section 111 that sets the current generation voltage command values Vr1, Vr2 for the first and second modes, respectively, so as to follow the final target value Vo of the generation voltage to the battery 104, and the generation voltage update calculation command section 110 that instructs the next update timing to and the amount of increase dH and the amount of decrease dL of the generation voltage command value to the generation voltage command value calculation section 111 based on the state of the generator motor 102 and the state of the battery 104.

With this, it is possible to achieve load response control particularly in the rotating electrical machine with a plurality of power generating operations without inviting an increase in the size and cost as well as a reduction in the reliability of the apparatus.

That is, not only in a steady state but also in case where the final target value Vo of the generation voltage is changed rapidly, it is possible to achieve power generation voltage control in accordance with the state of the rotating electrical machine 102 or the state of the battery 104, and hence it is possible to perform load response control in both of the power generation modes.

Moreover, the generation voltage command value calculation section 111 calculates the first and second generation voltage command values Vr1, Vr2 by adding the amount of increase dH and the amount of decrease dL of the generation voltage command value from the generation voltage update calculation command section 110 to the current generation voltage command value Vref at each update timing tn from the generation voltage update calculation command section 110, and by further adding the individual offset voltages Voff1, Voff2 in the first and second modes to the results of addition of the amount of increase dH and the amount of decrease dL at each update timing tn.

As a result, a difference of ripple voltages in the individual power generation modes can be absorbed, and a deviation of the generated voltages in the individual power generation modes can be suppressed, thereby making it possible to achieve highly reliable control.

In addition, the generation voltage update calculation command section 110 individually sets the next update timing tn and the amount of increase dH and the amount of decrease dL of the generation voltage command value at least in a power generating operation immediately after the starting of the internal combustion engine 101 and a power generating operation not immediately after engine starting.

As a result, the individual amount of increase dH, the individual amount of decrease dL and the individual update timing tn can be set by distinguishing the power generating operation immediately after the starting of the internal combustion engine 101 (engine) in which the battery voltage VB is rapidly reduced and the power generating operation not immediately after engine starting from each other, whereby it is possible to change the time required to make the generated voltage to follow the final target value Vo.

Accordingly, it is possible to shift the generator motor to a power generating operation without providing a rapid load torque to the internal combustion engine 101.

Moreover, in case where the torque command amount Tqr when the generator motor 102 operates as an electric motor is larger than or equal to the predetermined torque TqM, the generation voltage update calculation command section 110 determines that the generator motor is in a power generating operation immediately after the starting of the internal combustion engine 101, whereas in case where the torque command amount Tqr when the generator motor 102 operates as an electric motor is smaller than the predetermined torque TqM, it is determined that the generator motor is not in a power generating operation immediately after engine starting.

That is, even when the generator motor 102 operates as an electric motor, if Tqr<TqM (e.g., the generator motor only assists the internal combustion engine 101), the amount of electric power (current) taken out from the battery 104 is small, so it is possible to achieve highly reliable control by setting the amount of increase dH and the amount of decrease dL based on the above determination processing differently from the case immediately after engine starting.

In addition, in the above-mentioned determination of the power generating operation, the torque command amount Tqr, being used for control, is employed instead of using the amount of current, so a current detection device for the battery 104 is not needed, thus avoiding an increase in cost.

Further, when the time from when the generator motor 102 terminates operation as an electric motor until the start of a power generating operation is more than or equal to a predetermined time, the generation voltage update calculation command section 110 inhibits a determination operation as to whether the generator motor is in a power generating operation immediately after engine starting.

That is, in case where the time from when the generator motor 102 terminates operation as an electric motor until the start of a power generating operation is long (e.g., when the battery voltage VB rises up to a release voltage, and the internal combustion engine 101 is permissible for the load torque), it is possible to achieve highly reliable control by setting the amount of increase dH and the amount of decrease dL differently from the case immediately after engine starting.

In addition, when it is determined that the internal combustion engine 101 is immediately after engine starting, the generation voltage update calculation command section 110 determines, as a power generating operation immediately after engine starting, a state until the current generation voltage command value Vref becomes equal to the final target value Vo of the generation voltage to the battery 104 or a state until the generator motor 102 terminates the power generating operation before the current generation voltage command value Vref becomes equal to the final target value Vo of the generation voltage to the battery 104.

As a result, it is possible to keep continuing the power generating operation immediately after engine starting in a reliable manner in a period from the determination of the power generating operation immediately after engine starting until when the generation voltage command value Vr becomes equal to the final target value Vo of the generation voltage.

Moreover, when the rotational speed Na of the generator motor 102 is higher than the second predetermined rotational speed Nmax, the generation voltage update calculation command section 110 sets the amount of increase dH and the amount of decrease dL of the generation voltage command value so as to make the current generation voltage command value Vref become the final target value Vo without executing a following operation to the final target value Vo.

That is, when the rotational speed Na is high to a satisfactory extent, the generated torque of the internal combustion engine 101 is sufficiently large with respect to the torque taken by power generation and there is no need to execute those response control, so it is possible to improve voltage following capability by making the current generated voltage to be the final target value Vo.

Further, when it is determined that the generation voltage command value exceeds a permissible amount of electric power generatable by the generator motor 102, the generation voltage update calculation command section 110 sets the amount of increase of the generation voltage command value to substantially zero.

That is, when the amount of electric power generated exceeds the permissible amount of electric power generatable by the generator motor 102, the battery voltage VB can not be expected to rise, so a deviation between a control amount and an actual voltage can be suppressed to a minimum by inhibiting the following operation of the generated voltage, and it is possible to alleviate an overshoot of the voltage upon reduction of the amount of electric power generated.

Here, note that a problem as referred to above does not occur at a decrease side of the generation voltage command value, and the generation voltage following operation is continued.

In addition, when the rotational speed Na of the generator motor 102 becomes less than or equal to the third predetermined rotational speed Nmin, the generation voltage update calculation command section 110 sets the amount of increase dH of the generation voltage command value to substantially zero.

That is, if electric power generation is continued as it is when the rotational speed Na of the generator motor 102 decreases up to the third predetermined rotational speed Nmin or below, the power generating operation will be kept continued in a region where the torque generated by the internal combustion engine 101 is small, so there is the possibility of causing the stoppage (engine stall) of the internal combustion engine 101, and additionally, the amount of electric power generated by the generator motor 102 is also reduced in accordance with the decreasing rotational speed Na. As a result, the trouble of the engine stall, etc., can be avoided by setting the amount of increase dH to substantially zero to inhibit the generation voltage following operation.

Here, note that there is no problem at the decrease side of the generation voltage command value, and the generation voltage following operation is continued.

Moreover, when the battery voltage VB changes more than a predetermined voltage with the current generation voltage command value Vref and the final target value Vo of the generation voltage to the battery 104 being equal to each other, the generation voltage update calculation command section 110 sets the current generation voltage command value Vref to the battery voltage VB.

That is, in case where a rapid electric load variation occurs with the current generation voltage command value Vref and the final target value Vo of the generation voltage being equal to each other, it is possible to suppress the rapid generation of load torque to the internal combustion engine 101 by executing a following operation from the battery voltage VB with the current generation voltage command value Vref being reduced (or raised) up to the battery voltage VB.

Further, in case where the final target value Vo of the generation voltage to the battery 104 is higher than or equal to the battery voltage VB and the current generation voltage command value Vref is lower than the battery voltage VB, the generation voltage update calculation command section 110 sets the current generation voltage command value Vref to the battery voltage VB.

That is, when the battery voltage VB rises more than the current generation voltage command value Vref due to the variation of the electric load, etc., in a state where the current generation voltage command value Vref is caused to rise toward the final target value Vo, it is possible to avoid an unnecessary waiting time until the current generation voltage command value Vref catches up the battery voltage VB according to the following operation, by setting the current generation voltage command value Vref to the battery voltage VB thus raised, and it is also possible to avoid the output of an unnecessary control amount.

On the other hand, in case where the final target value Vo of the generation voltage to the battery 104 is lower than the battery voltage VB and the current generation voltage command value Vref is higher than or equal to the battery voltage VB, the generation voltage update calculation command section 110 sets the current generation voltage command value Vref to the battery voltage VB.

That is, when the battery voltage VB falls below the current generation voltage command value Vref due to the variation of the electric load, etc., in a state where the current generation voltage command value Vref is caused to fall toward the final target value Vo, it is possible to avoid an unnecessary waiting time and the output of an unnecessary control amount until the current generation voltage command value Vref catches up the battery voltage VB according to the following operation, by setting the current generation voltage command value Vref to the battery voltage VB thus fallen.

In addition, when the generator motor 102 does not operate as a generator, the generation voltage update calculation command section 110 sets the current generation voltage command value Vref to the battery voltage VB.

That is, in case of other than the power generating operation, by setting the current generation voltage command value Vref to the battery voltage VB, an initial value of the current generation voltage command value Vref can be given without depending upon the timing at which the generator motor 102 shifts to the power generating operation.

The invention claimed is:

1. A power generation control apparatus of a rotating electrical machine for a vehicle, characterized by comprising:
a power control unit that is connected to said rotating electrical machine for controlling thereof, said rotating electrical machine having an armature winding and a field winding and being mechanically coupled with an internal combustion engine for the vehicle so as to operate at least as a generator;
a storage battery that delivers and receives electric power to and from said rotating electrical machine through said power control unit; and
a rotational speed detection part that detects a rotational speed of said rotating electrical machine;
wherein when the detected rotational speed of said rotating electrical machine is less than or equal to a first predetermined rotational speed during operation of said rotating electrical machine as said generator, said power control unit controls a power generating operation of said rotating electrical machine in a first mode based on a compensation current for phase control to said armature winding and an energization current to said field winding, and when the detected rotational speed of said rotating electrical machine is higher than said first predetermined rotational speed, said power control unit controls the power generating operation of said rotating electrical machine in a second mode based on a field duty that controls the energization current to said field winding; and
wherein said power control unit includes:
a generation voltage command value calculation section that sets a current generation voltage command value for each of said first and second modes so as to follow a final target value of a generation voltage to said storage battery; and
a generation voltage update calculation command section that instructs a next generation voltage command update timing, an amount of increase and an amount of decrease of said generation voltage command value to said generation voltage command value calculation section based on a state of said rotating electrical machine and a state of said storage battery, and
wherein said generation voltage update calculation command section individually sets the next generation voltage update timing, the amount of increase and the amount of decrease of said generation voltage command value at least in a power generating operation immediately after the starting of said internal combustion engine and a power generating operation not immediately after said engine starting.

2. A power generation control apparatus of a rotating electrical machine for a vehicle, characterized by comprising:
a power control unit that is connected to said rotating electrical machine for controlling thereof, said rotating electrical machine having an armature winding and a field winding and being mechanically coupled with an internal combustion engine for the vehicle so as to operate at least as a generator;
a storage battery that delivers and receives electric power to and from said rotating electrical machine through said power control unit; and
a rotational speed detection part that detects a rotational speed of said rotating electrical machine;
wherein when the detected rotational speed of said rotating electrical machine is less than or equal to a first predetermined rotational speed during operation of said rotating electrical machine as said generator, said power control unit controls a power generating operation of said rotating electrical machine in a first mode based on a compensation current for phase control to said armature winding and an energization current to said field winding, and when the detected rotational speed of said rotating electrical machine is higher than said first predetermined rotational speed, said power control unit controls the power generating operation of said rotating electrical machine in a second mode based on a field duty that controls the energization current to said field winding; and
wherein said power control unit includes:
a generation voltage command value calculation section that sets a current generation voltage command value for each of said first and second modes so as to follow a final target value of a generation voltage to said storage battery; and a generation voltage update calculation command section that instructs a next generation voltage command update timing, an amount of increase and an amount of decrease of said generation voltage command value to said generation voltage command value calculation section based on a state of said rotating electrical machine and a state of said storage battery, and wherein said generation voltage command value calculation section adds the amount of increase and the amount of decrease of said generation voltage command value from said generation voltage update calculation command section to the current generation voltage command value at each generation voltage command update timing from said generation voltage update calculation command section;

said generation voltage command value calculation section adds individual offset voltages for said first and second modes, respectively, to results of addition of the amount of increase and the amount of decrease of said power generation voltage command value at each said power generation voltage command update timing; and said generation voltage command value calculation section calculates individual generation voltage command values in said first and second modes, respectively.

3. The power generation control apparatus of a rotating electrical machine for a vehicle as set forth in claim 1,
characterized in that in case where a torque command amount at the time when said rotating electrical machine operates as said electric motor is larger than or equal to a predetermined torque, said generation voltage update calculation command section determines that said rotating electrical machine is in said power generating operation immediately after starting of said internal combustion engine; and in case where said torque command amount at the time when said generator motor operates as an electric motor is smaller than said predetermined torque, said generation voltage update calculation command section determines that said rotating electrical machine is not in said power generating operation immediately after engine starting.

4. The power generation control apparatus of a rotating electrical machine for a vehicle as set forth in claim 1,
characterized in that in case where a time from when said generator motor terminates operation as said electric motor until the start of said power generating operation is more than or equal to a predetermined time, said generation voltage update calculation command section inhibits a determination operation as to whether said rotating electrical machine is in said power generating operation immediately after engine starting.

5. The power generation control apparatus of a rotating electrical machine for a vehicle as set forth in claim 1,
characterized in that when it is determined that said internal combustion engine is immediately after said engine starting, said generation voltage update calculation command section determines, as said power generating operation immediately after engine starting, a state until the current generation voltage command value becomes equal to the final target value of the generation voltage to said storage battery or a state until said generator motor terminates said power generating operation before said current generation voltage command value becomes equal to the final target value of the generation voltage to said storage battery.

6. The power generation control apparatus of a rotating electrical machine for a vehicle as set forth in claim 1,
characterized in that said generation voltage update calculation command section sets the amount of increase and the amount of decrease of said generation voltage command value so as to make the current generation voltage command value become said final target value without executing a following operation to said final target value when the rotational speed of said rotating electrical machine is higher than a second predetermined rotational speed.

7. The power generation control apparatus of a rotating electrical machine for a vehicle as set forth in claim 1,
characterized in that said generation voltage update calculation command section sets the amount of increase of said generation voltage command value to substantially zero when determining that said generation voltage command value exceeds a permissible amount of electric power generatable by said rotating electrical machine.

8. The power generation control apparatus of a rotating electrical machine for a vehicle as set forth in claim 1,
characterized in that said generation voltage update calculation command section sets the amount of increase of said generation voltage command value to substantially zero when determining that the rotational speed of said rotating electrical machine becomes less than or equal to a third predetermined rotational speed.

9. The power generation control apparatus of a rotating electrical machine for a vehicle as set forth in claim 1,
characterized in that said generation voltage update calculation command section sets the current generation voltage command value to the voltage value of said storage battery when the voltage of said storage battery changes more than a predetermined voltage with said current generation voltage command value and the final target value of the generation voltage to said storage battery being equal to each other.

10. The power generation control apparatus of a rotating electrical machine for a vehicle as set forth in claim 1,
characterized in that said generation voltage update calculation command section sets the current generation voltage command value to the voltage value of said storage battery when the final target value of the generation voltage to said storage battery is higher than or equal to the voltage of said storage battery, and when said current generation voltage command value is lower than the voltage of said storage battery.

11. The power generation control apparatus of a rotating electrical machine for a vehicle as set forth in claim 1,
characterized in that said generation voltage update calculation command section sets the current generation voltage command value to the voltage value of said storage battery when the final target value of the generation voltage to said storage battery is lower than the voltage of said storage battery, and when said current generation voltage command value is higher than or equal to the voltage of said storage battery.

12. The power generation control apparatus of a rotating electrical machine for a vehicle as set forth in claim 1,
characterized in that said generation voltage update calculation command section sets the current generation voltage command value to the voltage value of said storage battery when said rotating electrical machine does not operate as said generator.

13. The power generation control apparatus of a rotating electrical machine for a vehicle as set forth in claim 2,
characterized in that said generation voltage update calculation command section individually sets the next generation voltage update timing, the amount of increase and the amount of decrease of said generation voltage command value at least in a power generating operation immediately after the starting of said internal combustion engine and a power generating operation not immediately after said engine starting.

14. The power generation control apparatus of a rotating electrical machine for a vehicle as set forth in claim 13,
characterized in that in case where a torque command amount at the time when said rotating electrical machine operates as said electric motor is larger than or equal to a predetermined torque, said generation voltage update calculation command section determines that said rotating electrical machine is in said power generating operation immediately after starting of said internal combustion engine; and in case where said torque command amount at the time when said generator motor operates as an electric motor is smaller than said predetermined torque, said generation voltage update calculation command section determines that said rotating electrical machine is not in said power generating operation immediately after engine starting.

\* \* \* \* \*